United States Patent
He et al.

(10) Patent No.: US 11,550,654 B2
(45) Date of Patent: Jan. 10, 2023

(54) APPARATUS WITH LATCH CORRECTION MECHANISM AND METHODS FOR OPERATING THE SAME

(71) Applicant: Micron Technology, Inc., Boise, ID (US)

(72) Inventors: Yuan He, Boise, ID (US); Jiyun Li, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 67 days.

(21) Appl. No.: 17/100,775

(22) Filed: Nov. 20, 2020

(65) Prior Publication Data

US 2022/0164251 A1 May 26, 2022

(51) Int. Cl.
| | | |
|---|---|---|
| G06F 11/10 | (2006.01) | |
| G06K 9/62 | (2022.01) | |
| G06F 1/12 | (2006.01) | |
| G06F 1/10 | (2006.01) | |

(52) U.S. Cl.
CPC ............... *G06F 11/10* (2013.01); *G06F 1/10* (2013.01); *G06F 1/12* (2013.01); *G06K 9/6288* (2013.01)

(58) Field of Classification Search
CPC ... G06F 11/10; G06F 1/10; G06F 1/12; G06K 9/6288
See application file for complete search history.

(56) References Cited

U.S. PATENT DOCUMENTS

| | | | |
|---|---|---|---|
| 10,020,074 B1* | 7/2018 | Jeong | ................... H01L 27/12 |
| 10,600,781 B1 | 3/2020 | Xiao et al. | |
| 11,159,166 B2 | 10/2021 | Lee et al. | |
| 2008/0159042 A1 | 7/2008 | Bertin et al. | |
| 2010/0320598 A1 | 12/2010 | Murayama et al. | |
| 2016/0181260 A1 | 6/2016 | Lee | |
| 2017/0123946 A1 | 5/2017 | Wu et al. | |
| 2017/0309634 A1 | 10/2017 | Noguchi et al. | |
| 2019/0179701 A1* | 6/2019 | Lee | ................... G11C 17/16 |
| 2020/0098748 A1 | 3/2020 | Xiao et al. | |

(Continued)

FOREIGN PATENT DOCUMENTS

| | | |
|---|---|---|
| KR | 20080111329 A | 12/2008 |
| KR | 20160074925 A | 6/2016 |

OTHER PUBLICATIONS

International Application No. PCT/US2021/058124—International Search Report and Written Opinion, dated Feb. 17, 2022, 11 pages.

*Primary Examiner* — Kyle Vallecillo
(74) *Attorney, Agent, or Firm* — Perkins Coie LLP

(57) ABSTRACT

Methods, apparatuses, and systems related to an apparatus are described. The apparatus may include (1) a fuse array configured to provide non-volatile storage of fuse data and (2) local latches configured to store the fuse data during runtime of the apparatus. The apparatus may further include an error processing circuit configured to determine error detection-correction data for the fuse data. The apparatus may subsequently broadcast data stored in the local latches to the error processing circuit to determine, using the error detection-correction data, whether the locally latched data has been corrupted. The error processing circuit may generate corrected data to replace the locally latched data based on determining corruption in the locally latched data.

19 Claims, 9 Drawing Sheets

(56) References Cited

U.S. PATENT DOCUMENTS

| | | |
|---|---|---|
| 2020/0192755 A1* | 6/2020 | Jeong .................. G06F 11/1048 |
| 2020/0265912 A1 | 8/2020 | Wieduwilt et al. |
| 2021/0111152 A1 | 4/2021 | Park et al. |
| 2021/0217760 A1 | 7/2021 | Yang et al. |
| 2022/0085056 A1 | 3/2022 | Zhang et al. |

* cited by examiner

APPARATUS WITH LATCH CORRECTION MECHANISM AND METHODS FOR OPERATING THE SAME

TECHNICAL FIELD

The disclosed embodiments relate to devices, and, in particular, to semiconductor memory devices with latch correction mechanisms and methods for operating the same.

BACKGROUND

An apparatus (e.g., a processor, a memory system, and/or other electronic apparatus) can include one or more semiconductor circuits configured to store and/or process information. For example, the apparatus can include a memory device, such as a volatile memory device, a non-volatile memory device, or a combination device. Memory devices, such as dynamic random-access memory (DRAM), utilize electro-magnetic energy to store and access data.

Technological improvements are often associated with decreases in the physical sizes of the apparatus and/or circuits therein. However, decreasing the physical size often presents new or additional challenges. For example, some memory devices include predetermined information (e.g., failure/repair information, device identifier, etc.) stored in non-volatile memory (e.g., fuses). The information in the non-volatile memory is broadcasted to circuits/portions within the memory devices following designated events like power-on or power-reset events. Various circuits/portions within the memory devices include a set of fuse latches configured to locally load and/or store the broadcasted information. While reducing the size/footprint of each latch may be desirable, such reductions lower a drive capacity for loading to and/or accessing from the information relative to the latch. Accordingly, the amount of charge needed to change the state (e.g., latched voltage levels) of the latch is reduced, which leads to increase in data errors (e.g., soft error rates (SER) caused by the changes in the latched data.

DETAILED DESCRIPTION

Figure 1:
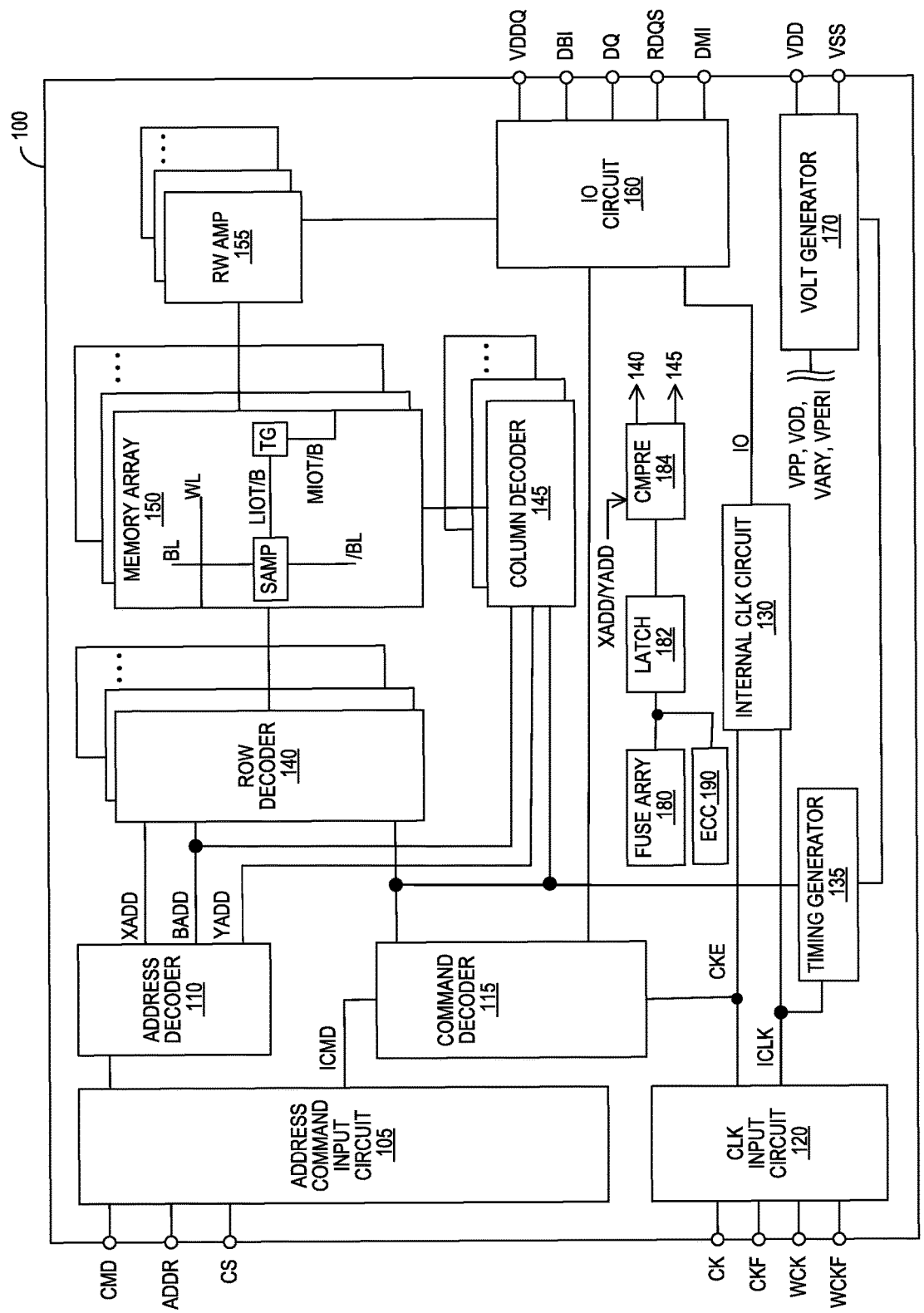
FIG. 1 is a block diagram of an apparatus in accordance with an embodiment of the present technology.

As described in greater detail below, the technology disclosed herein relates to an apparatus, such as for memory systems, systems with memory devices, related methods, etc., for monitoring and correcting locally latched data. The apparatus (e.g., a memory device and/or a system including the memory device) can include error correction circuits configured to periodically check and/or update locally latched data. The error correction circuits can be shared by multiple latches, bank groups, etc. The error correction circuits can include an error correction code (ECC) circuit local to or on a die.

The apparatus can include predetermined information, such as initial configuration data, stored in non-volatile memory (e.g., fuses). Following a qualifying event, such as a power cycle or reset, the apparatus can broadcast the predetermined information across relevant circuits. Each relevant circuit can include fuse latches configured to load/latch a relevant portion of the broadcast data for local storage and access.

Fuse latches may be associated with soft errors that contribute to uncorrectable error correction code (UECC) errors, which further correspond to failure in time (FIT) measures. The soft errors associated with the fuse latches may be caused by insufficient drive capacity (e.g., ability to load and/or access the data into/from the latches) and/or unintended changes in the latch states due to external influence (e.g., neutron strikes on transistors and/or row-hammer effects). In other words, the accurately latched information may be susceptible to run-time corruptions/errors.

As described in detail below, the apparatus may include an error processing mechanism configured to detect and correct errors in the locally latched data. For example, an ECC block may be coupled to (e.g., at a centralized location and/or physically proximate to) a fuse array that stores the predetermined information. The apparatus can broadcast the predetermined information stored in the fuse array. The ECC block can generate error detection/correction data (e.g., parity data) based on processing the broadcasted information. As an illustrative example, the broadcasted data can be organized into units/groupings that each correspond to and targeted to be latched at a particular circuit receiving the broadcast. The ECC block can access the broadcast data, such as by listening to the broadcast medium/line, and the ECC block can generate the ECC parity data for each unit of broadcast data. The ECC block can communicate/output the ECC parity data subsequent to the corresponding unit of broadcast data. Accordingly, the ECC parity data can be generated in real-time without being stored in the fuse array. In other words, the storage size (e.g., number of stored bits) of the fuse array may be less than the latched size (e.g., number of latched bits) for the functional circuits.

The functional circuits can receive and store (e.g., latch) the error detection/correction data along with the broadcast data targeted for the corresponding functional circuit. The apparatus can be configured to periodically transmit the latched data, including the error detection/correction data, from the functional circuits over the broadcast means. For example, the circuits can broadcast the locally stored data according to a predetermined sequence, such as the broadcast sequence. Accordingly, the ECC block can obtain the data and/or the corresponding parity data stored in the fuse latches of the functional circuits. The ECC block can analyze the locally latched data and the parity data to determine whether the latched data has been corrupted (e.g., includes one or more errors). When the ECC block detects data corruption, the ECC block can generate the corrected data that can be latched at the corresponding functional circuit. When the ECC block does not detect the data corruption, the ECC block can trigger (via, e.g., token and/or clock signals) the next functional block to broadcast the locally latched information. In some embodiments, the corruption detection process can be paused such that the locally stored data for a remaining set of the functional circuits are processed/analyzed at a later time, such as after executing a commanded function.

The ECC block processing the locally latched ECC data along with the broadcast data provides reduced soft errors associated with the fuse latches. The ECC block can actively correct run-time corruptions in the latched data, thereby reducing the soft error. Moreover, the ECC block can leverage the existing broadcast circuits and processes to implement the error reduction, thereby minimizing the design efforts and/or the resources required for the ECC block. Alternatively or additionally, the apparatus can leverage the increased error correction capacity of the ECC and reduce the physical sizes of the fuse latch circuits. Due to the overwhelming number of fuse latches, size reduction in each fuse latch can outweigh additional circuits (e.g., the ECC block and/or the local ECC data latches) required to implement the ECC block. Accordingly, the ECC block and the corresponding implementation details can provide a reduced physical size/footprint for the apparatus.

FIG. 1 is a block diagram of an apparatus 100 (e.g., a semiconductor die assembly, including a three-dimensional integration (3DI) device or a die-stacked package) in accordance with an embodiment of the present technology. For example, the apparatus 100 can include a DRAM or a portion thereof that includes one or more dies/chips.

The apparatus 100 may include an array of memory cells, such as memory array 150. The memory array 150 may include a plurality of banks (e.g., banks 0-15), and each bank may include a plurality of word-lines (WL), a plurality of bit lines (BL), and a plurality of memory cells arranged at intersections of the word-lines and the bit lines. Memory cells can include any one of a number of different memory media types, including capacitive, magnetoresistive, ferroelectric, phase change, or the like. The selection of a word-line WL may be performed by a row decoder 140, and the selection of a bit line BL may be performed by a column decoder 145. Sense amplifiers (SAMP) may be provided for corresponding bit lines BL and connected to at least one respective local I/O line pair (LIOT/B), which may in turn be coupled to at least respective one main I/O line pair (MIOT/B), via transfer gates (TG), which can function as switches. The sense amplifiers and transfer gates may be operated based on control signals from decoder circuitry, which may include the command decoder 115, the row decoders 140, the column decoders 145, any control circuitry of the memory array 150, or any combination thereof. The memory array 150 may also include plate lines and corresponding circuitry for managing their operation.

The apparatus 100 may employ a plurality of external terminals that include command and address terminals coupled to a command bus and an address bus to receive command signals (CMD) and address signals (ADDR), respectively. The apparatus 100 may further include a chip select terminal to receive a chip select signal (CS), clock terminals to receive clock signals CK and CKF, data clock terminals to receive data clock signals WCK and WCKF, data terminals DQ, RDQS, DBI, and DMI, power supply terminals VDD, VSS, and VDDQ.

The command terminals and address terminals may be supplied with an address signal and a bank address signal (not shown in FIG. 1) from outside. The address signal and the bank address signal supplied to the address terminals can be transferred, via a command/address input circuit 105, to an address decoder 110. The address decoder 110 can receive the address signals and supply a decoded row address signal (XADD) to the row decoder 140, and a decoded column address signal (YADD) to the column decoder 145. The address decoder 110 can also receive the bank address signal and supply the bank address signal to both the row decoder 140 and the column decoder 145.

The command and address terminals may be supplied with command signals (CMD), address signals (ADDR), and chip select signals (CS), from a memory controller and/or a nefarious chipset. The command signals may represent various memory commands from the memory controller (e.g., including access commands, which can include read commands and write commands). The chip select signal may be used to select the apparatus 100 to respond to commands and addresses provided to the command and address terminals. When an active chip select signal is provided to the apparatus 100, the commands and addresses can be decoded, and memory operations can be performed. The command signals may be provided as internal command signals ICMD to a command decoder 115 via the command/address input circuit 105. The command decoder 115 may include circuits to decode the internal command signals ICMD to generate various internal signals and commands for performing memory operations, for example, a row command signal to select a word-line and a column command signal to select a bit line. The command decoder 115 may further include one or more registers for tracking various counts or values (e.g., counts of refresh commands received by the apparatus 100 or self-refresh operations performed by the apparatus 100).

Read data can be read from memory cells in the memory array 150 designated by row address (e.g., address provided with an active command) and column address (e.g., address provided with the read). The read command may be received by the command decoder 115, which can provide internal commands to input/output circuit 160 so that read data can be output from the data terminals DQ, RDQS, DBI, and DMI via read/write amplifiers 155 and the input/output circuit 160 according to the RDQS clock signals. The read data may be provided at a time defined by read latency information RL that can be programmed in the apparatus 100, for example, in a mode register (not shown in FIG. 1). The read latency information RL can be defined in terms of clock cycles of the CK clock signal. For example, the read latency information RL can be a number of clock cycles of the CK signal after the read command is received by the apparatus 100 when the associated read data is provided.

Write data can be supplied to the data terminals DQ, DBI, and DMI according to the WCK and WCKF clock signals. The write command may be received by the command decoder 115, which can provide internal commands to the input/output circuit 160 so that the write data can be received by data receivers in the input/output circuit 160 and supplied via the input/output circuit 160 and the read/write amplifiers 155 to the memory array 150. The write data may be written in the memory cell designated by the row address and the column address. The write data may be provided to the data terminals at a time that is defined by write latency WL information. The write latency WL information can be programmed in the apparatus 100, for example, in the mode register. The write latency WL information can be defined in terms of clock cycles of the CK clock signal. For example, the write latency information WL can be a number of clock cycles of the CK signal after the write command is received by the apparatus 100 when the associated write data is received.

The power supply terminals may be supplied with power supply potentials $V_{DD}$ and $V_{SS}$. These power supply potentials $V_{DD}$ and $V_{SS}$ can be supplied to an internal voltage generator circuit 170. The internal voltage generator circuit 170 can generate various internal potentials $V_{PP}$, $V_{OD}$, $V_{ARY}$, $V_{PERI}$, and the like based on the power supply potentials $V_{DD}$ and $V_{SS}$. The internal potential $V_{PP}$ can be used in the row decoder 140, the internal potentials $V_{OD}$ and $V_{ARY}$ can be used in the sense amplifiers included in the memory array 150, and the internal potential $V_{PERI}$ can be used in many other circuit blocks.

The power supply terminal may also be supplied with power supply potential $V_{DDQ}$. The power supply potential $V_{DDQ}$ can be supplied to the input/output circuit 160 together with the power supply potential VSS. The power supply potential $V_{DDQ}$ can be the same potential as the power supply potential $V_{SS}$ in an embodiment of the present technology. The power supply potential $V_{DDQ}$ can be a different potential from the power supply potential $V_{DD}$ in another embodiment of the present technology. However, the dedicated power supply potential $V_{DDQ}$ can be used for the input/output circuit 160 so that power supply noise generated by the input/output circuit 160 does not propagate to the other circuit blocks.

The clock terminals and data clock terminals may be supplied with external clock signals and complementary external clock signals. The external clock signals CK, CKF, WCK, WCKF can be supplied to a clock input circuit 120. The CK and CKF signals can be complementary, and the WCK and WCKF signals can also be complementary. Complementary clock signals can have opposite clock levels and transition between the opposite clock levels at the same time. For example, when a clock signal is at a low clock level a complementary clock signal is at a high level, and when the clock signal is at a high clock level the complementary clock signal is at a low clock level. Moreover, when the clock signal transitions from the low clock level to the high clock level the complementary clock signal transitions from the high clock level to the low clock level, and when the clock signal transitions from the high clock level to the low clock level the complementary clock signal transitions from the low clock level to the high clock level.

Input buffers included in the clock input circuit 120 can receive the external clock signals. For example, when enabled by a clock/enable signal from the command decoder 115, an input buffer can receive the clock/enable signals. The clock input circuit 120 can receive the external clock signals to generate internal clock signals ICLK. The internal clock signals ICLK can be supplied to an internal clock circuit 130. The internal clock circuit 130 can provide various phase and frequency controlled internal clock signals based on the received internal clock signals ICLK and a clock enable (not shown in FIG. 1) from the command/address input circuit 105. For example, the internal clock circuit 130 can include a clock path (not shown in FIG. 1) that receives the internal clock signal ICLK and provides various clock signals to the command decoder 115. The internal clock circuit 130 can further provide input/output (IO) clock signals. The IO clock signals can be supplied to the input/output circuit 160 and can be used as timing signals for determining output timing of read data and/or input timing of write data. The IO clock signals can be provided at multiple clock frequencies so that data can be output from and input to the apparatus 100 at different data rates. A higher clock frequency may be desirable when high memory speed is desired. A lower clock frequency may be desirable when lower power consumption is desired. The internal clock signals ICLK can also be supplied to a timing generator 135 and thus various internal clock signals can be generated.

The apparatus 100 can be connected to any one of a number of electronic devices capable of utilizing memory for the temporary or persistent storage of information, or a component thereof. For example, a host device of apparatus 100 may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device may be a networking device (e.g., a switch, a router, etc.) or a recorder of digital images, audio and/or video, a vehicle, an appliance, a toy, or any one of a number of other products. In one embodiment, the host device may be connected directly to apparatus 100; although in other embodiments, the host device may be indirectly connected to memory device (e.g., over a networked connection or through intermediary devices).

In some embodiments, the apparatus 100 can include non-volatile memory, such as fuses or anti-fuses, configured to store predetermined information. For example, the non-volatile memory may be used to store failure/repair information, device or circuit identifiers, and/or other operational information necessary across power cycles. Such non-volatile memory may be grouped, such as for a fuse array 180, and may be at a location removed/remote from the devices or circuits that use the stored information. Accordingly, one or more of the circuits or devices described above may include local latches 182 configured to load and store the predetermined information at a closer and/or more accessible location. For illustrative purposes the local latches 182 are shown near the fuse array 180, but it is understood that the local latches 182 may be placed away from the fuse array 180 and closer to other circuits, such as a comparison circuit 184, the row decoder 140, the column decoder 145, etc. The predetermined information in the non-volatile memory (e.g., the fuse array 180) may be communicated or broadcasted at a designated time, such as after a power-on event, and the devices/circuits may load the broadcasted information or a corresponding portion thereof in the local latches 182 for local storage. The term "local" can represent proximity (e.g., within a threshold distance) between the latches and a down-stream circuit configured to access the information stored in the latches.

The comparison circuit 184 can process the information in the local latches 182. As an example, the local latches 182 can store repair information used to swap defective rows/columns with redundant rows/columns. The comparison circuit 184 can receive addresses (e.g., row and/or column addresses) associated with incoming commands (e.g., read and/or write commands). The comparison circuit 184 can compare the receive addresses to the latched addresses to detect when the incoming commands are associated with defective cells. Based on the detection, the comparison circuit 184 and the subsequent circuits (e.g., the row decoder 140 and/or the column decoder 145) can access redundant memory instead of the defective cells associated with the command.

The apparatus 100 can include an error processing circuit 190 coupled to the fuse array 180 and/or the local latches 182. The error processing circuit 190 can include circuitry (e.g., active and/or passive components) configured to generate error detection/correction data according to the predetermined information in the fuse array 180 (e.g., the information broadcasted to the local latches 182). The error processing circuit 190 can be further configured to receive information (e.g., the locally latched broadcast data and the corresponding error detection/correction data) from the local latches 182 and determine whether the locally latched data includes one or more errors. The error processing circuit 190 can regenerate and/or broadcast the corrected broadcast data and/or an updated error detection/correction data when the obtained local data has been corrupted.

As an illustrative example, the error processing circuit 190 can include an ECC unit configured to generate an ECC parity. The ECC unit can generate the ECC parity for each grouping of broadcast data. The ECC unit can broadcast the ECC parity after the broadcast of the corresponding grouping of the broadcast data. After the initial broadcast, the apparatus 100 can be configured to communicate the data stored in the local latches 182 back to the ECC unit. In some embodiments, the apparatus 100 can be configured to communicate the locally latched data according to a predetermined frequency/duration, operating conditions, and the like. The ECC unit can receive the locally latched data and/or the locally latched ECC parity and process the received information to determine whether the received data includes any ECC errors. The ECC unit can output the corrected information when the received data includes one or more ECC errors. Details regarding the error processing circuit 190 and the corresponding processes described below.

Figure 2:
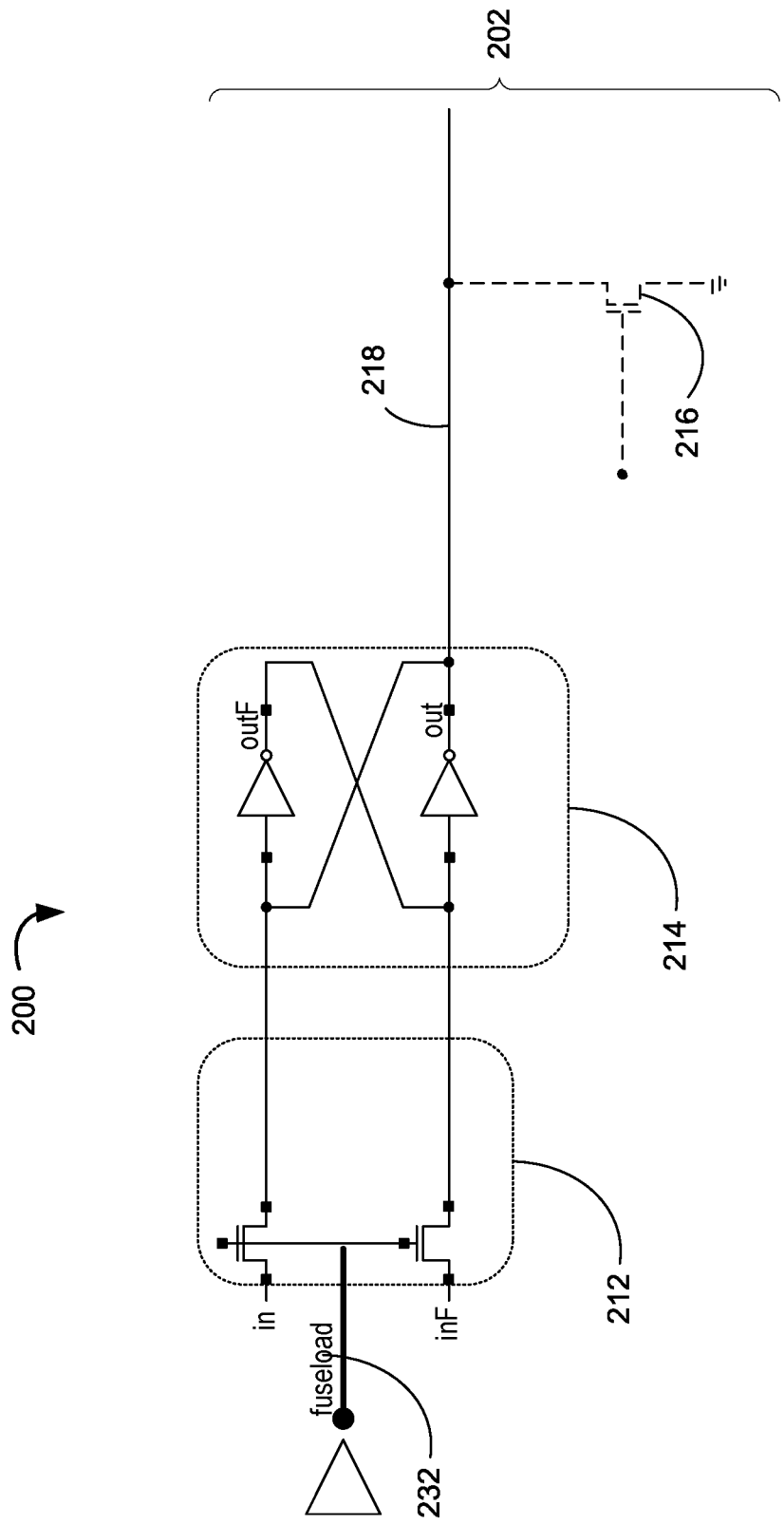
FIG. 2 is a schematic block diagram of an example latch in accordance with an embodiment of the present technology.

FIG. 2 is a schematic block diagram of an example latch (e.g., one of the fuse latches 182 of FIG. 1) in accordance with an embodiment of the present technology. As mentioned above, the apparatus 100 of FIG. 1 may broadcast information to one or more circuits illustrated in FIG. 1. Each of the one or more circuits may include a set of local latching circuits 200 configured to locally store the broadcast information or a portion thereof. As illustrated in FIG. 2, each local latching circuit 200 may store one bit in a storage portion 202 (e.g., a static random-access memory (SRAM) circuit or a D latch (DLAT) circuit). The storage portion 202 may include a load circuit 212, a retention circuit 214, and/or a pull-down circuit 216. The load circuit 212 may include circuitry configured to receive and load broadcast information into the retention circuit 214. In some embodiments, the load circuit 212 may include transistors (e.g., NMOS devices) connected to the broadcast line on one side/terminal and to the retention circuit 214 on an opposite side/terminal. The load circuit 212 may be connected to (e.g., at gates thereof) and controlled by a corresponding fuse activate signal 232. The fuse activate signal 232 can be used to identify when relevant/targeted information for the local latching circuit 200 is broadcasted during a fuse broadcast phase 204. Accordingly, the fuse activate signal 232 can operate the load circuit 212 to communicate the broadcast data at such timing to the retention circuit 214, thereby loading the relevant portion of the broadcast data. Also, the fuse activate signal 232 can be used to identify when the set of local latching circuits 200 is to communicate or broadcast the data stored in the storage portion 202 (e.g., at the retention circuit 214).

The retention circuit 214 can include circuitry configured to store the loaded data and provide access thereto during operation of the apparatus 100. In other words, the retention circuit 214 may include volatile memory configured to store a locally relevant portion of the broadcast data. In some embodiments, the retention circuit 214 may include cross-coupled inverters. The cross-coupled inverters may include a first inverter and a second inverter. An input of the first inverter may be connected to a first load transistor and an output of the second inverter. An input of the second inverter may be connected to a second load transistor and an output of the first inverter. The output of the second inverter may be connected to an access node 218 where the latched data may be accessed or read by a downstream functional circuit (e.g., the comparison circuit 184 of FIG. 1).

In one or more embodiments, the local latching circuit 200 can include the pull-down circuit 216 (e.g., a transistor, such as an NMOS device) connected between the access node 218 and electrical ground. The pull-down circuit 216 can be configured to tie the access node 218 to ground and ensure a low state for certain conditions. In other embodiments, the local latching circuit 200 may be without the pull-down circuit 216. For example, the storage portion 202 may correspond to an SRAM circuit without the pull-down circuit 216.

Figure 3:
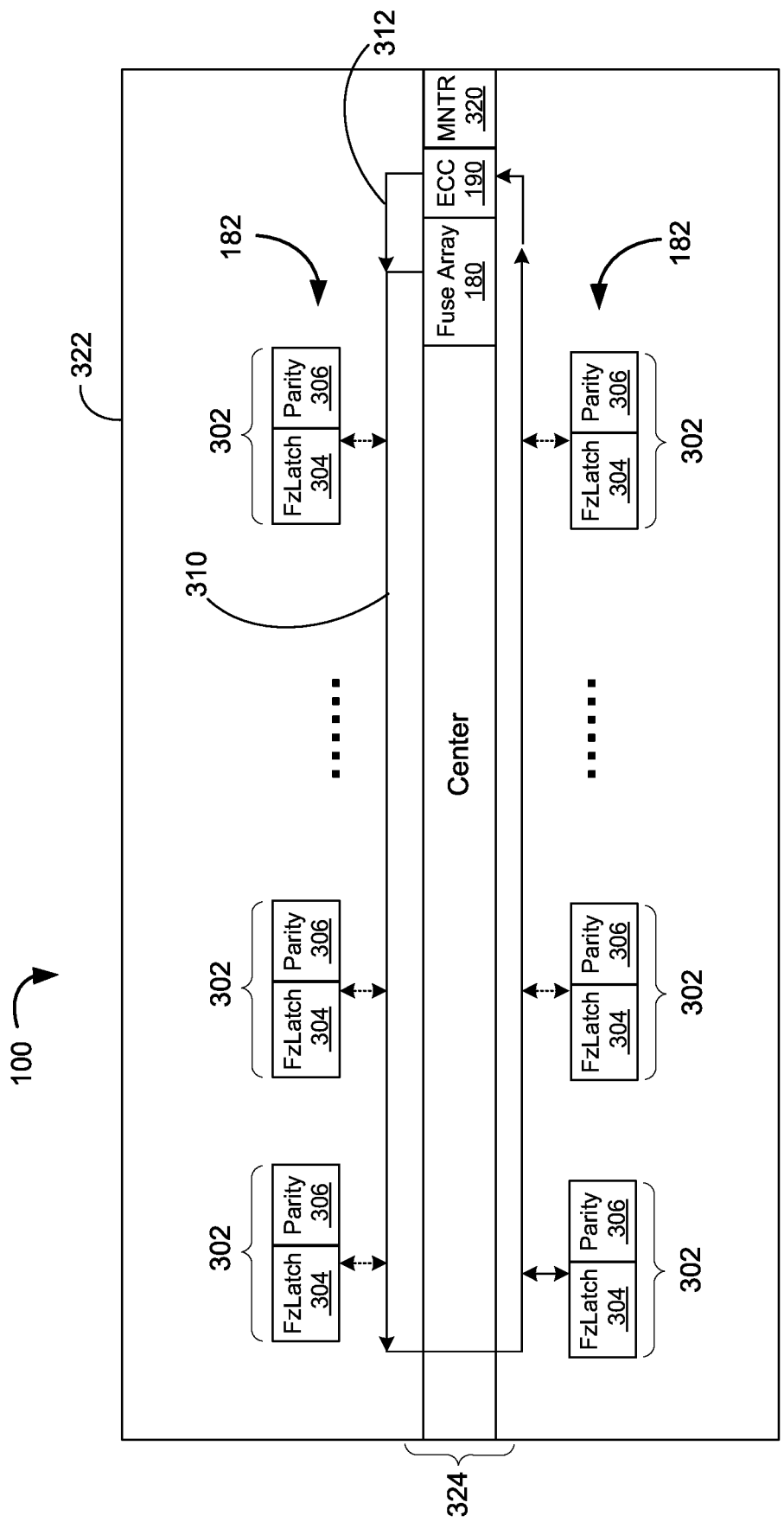
FIG. 3 is a block diagram of an example error processing mechanism in accordance with an embodiment of the present technology.

FIG. 3 is a block diagram of an example error processing mechanism in accordance with an embodiment of the present technology. The apparatus 100 can include the local latches 182 organized into local latch groupings 302. Each of the local latch groupings 302 can include the fuse latches local to and/or targeted for a corresponding functional circuit. Each of the local latch groupings 302 can include fuse latches 304 and one or more parity latches 306. The fuse latches 304 can be configured to locally latch or store data required or necessary for operating the corresponding functional circuit. The parity latches 306 can be configured to locally latch or store the ECC data (e.g., the error detection-correction data) corresponding to the fuse data.

The apparatus 100 can include a broadcast circuit configured to access and broadcast the fuse data stored in the fuse array 180. The broadcast circuit can communicate the fuse data using a broadcast communication path 310 (e.g., a set of conductors, such as traces and/or one or more buses). Each of the functional circuits and the corresponding local latch groupings 302 can be coupled to the broadcast communication path 310.

The broadcast communication path 310 can be further communicatively coupled to the error processing circuit 190 using an error processing path 312 (e.g., an additional set of conductors). In some embodiments, the error processing path 312 can be an extension of the broadcast communication path 310 that communicatively couples the error processing circuit 190 to the broadcasting circuit and/or the local latches 182.

The apparatus 100 can include a performance monitoring circuit 320 configured to monitor an error rate. The monitoring circuit 320 can be functionally coupled to the error processing circuit 190. The monitoring circuit 320 can track errors (e.g., ECC errors) in the locally stored data. For example, the apparatus 100 can be configured to broadcast the fuse data and/or the parity data from each of the local latch groupings 302 using the broadcast communication path 310. The error processing circuit 190 can receive and process the broadcasted information to detect errors/corruptions in the locally latched data. The monitoring circuit 320 can increment the tracked error count when the error processing circuit 190 detects errors/corruptions in the locally latched data. In some embodiments, the apparatus 100 can be configured to adjust the rebroadcast frequency based on the tracked error count.

The apparatus 100 can include the coupled set of local latches 182, the fuse array 180, the error processing circuit 190, the broadcast communication path 310, the error processing path 312, and/or the performance monitoring circuit 320 implemented on a die 322. In other words, each die 322 can include a set of the local latch groupings 302 for corresponding functional circuits. Accordingly, the die 322 can include the broadcast communication path 310 and the error processing path 312 that communicatively ties the local latches 182 to the fuse array 180, the error processing circuit 190, and/or the performance monitoring circuit 320. In some embodiments, the fuse array 180, the error processing circuit 190, and/or the performance monitoring circuit 320 can be physically located or implemented in a center portion 324 of the die 322.

Figure 4A:
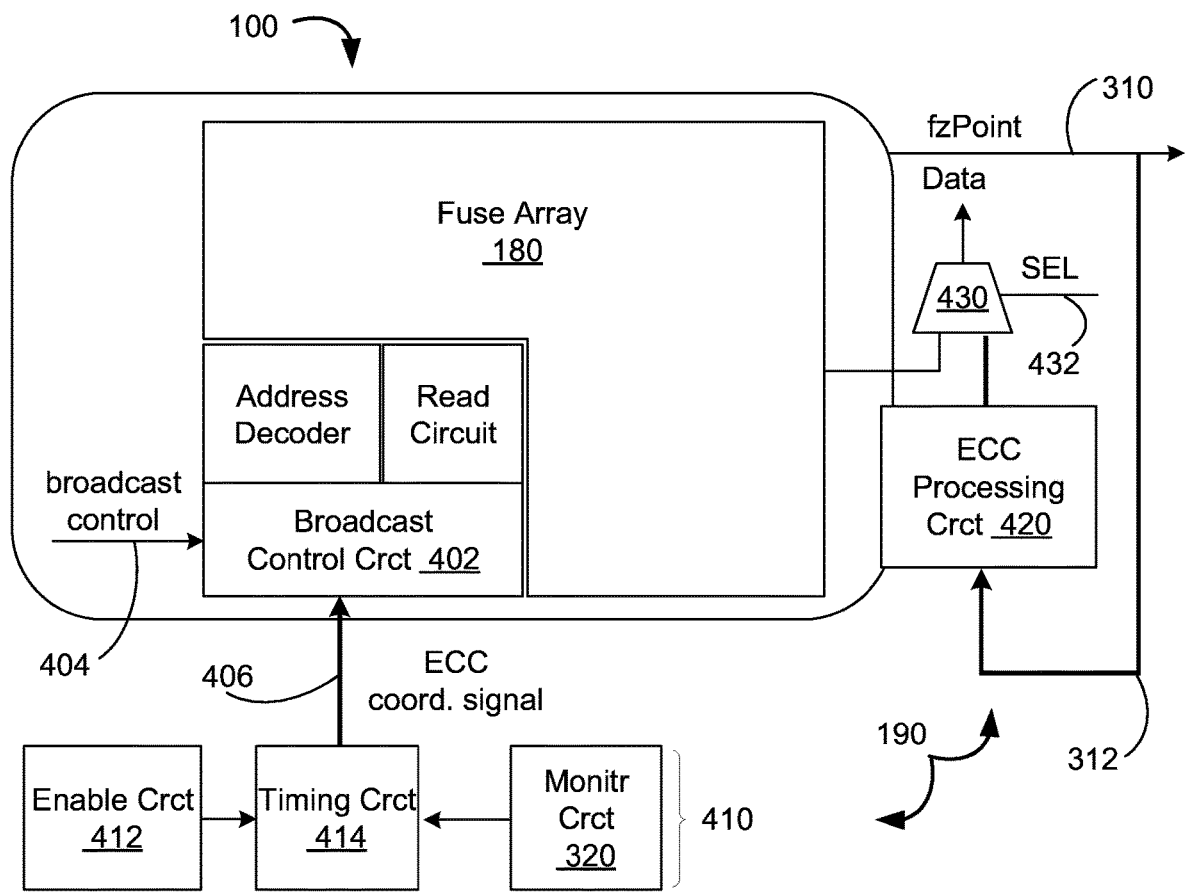
FIGS. 4A and 4B are block diagrams of example circuitry for the error processing mechanism in accordance with an embodiment of the present technology.
Figure 4B:
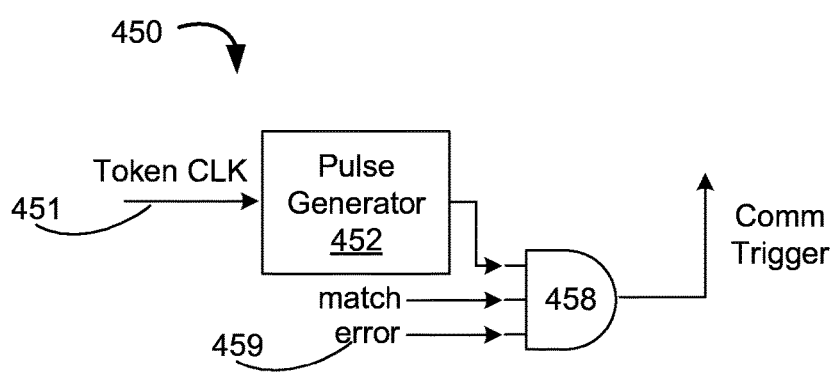

FIGS. 4A and 4B are block diagrams of example circuitry for the error processing mechanism in accordance with an embodiment of the present technology. FIG. 4A illustrates an example implementation of the error processing circuit 190 with respect to the fuse array 180, the broadcast communication path 310, the error processing path 312, etc.

The apparatus 100 can include a broadcast control circuit 402 coupled to the fuse array 180 and configured to control broadcasting of the non-volatile data stored in the fuse array 180 to the local latch groupings 302 of FIG. 3 and/or from the local latch groupings 302 to the error processing circuit 190. The broadcast control circuit 402 can also coordinate the initial broadcast of the error-related data (e.g., the parity) along with the initial broadcast of the corresponding fuse data. The broadcast control circuit 402 can include circuitry configured to access fuse data from the fuse array and transmit the accessed data over the broadcast communication path 310.

The broadcast control circuit 402 can receive and operate according to a broadcast control signal 404. The broadcast control signal 404 can be from a circuit associated with the broadcast trigger condition. For example, the broadcast control signal 404 can be from a power supply (e.g., the voltage generator 170 of FIG. 1) and correspond to a power on reset event. The broadcast control circuit 402 can initiate the initial broadcasting process (e.g., transmitting data in the fuse array 180 to the local latch groupings 302) according to the broadcast control signal 404. For example, the broadcast control circuit 402 can access predetermined locations of the fuse array 180 and communicate the accessed fuse data over the broadcast communication path 310 according to a predetermined sequence.

The broadcast control circuit 402 can further receive and operate according to an ECC coordination signal 406 generated by an ECC coordination circuit 410. The ECC coordination signal 406 can initiate a maintenance broadcasting process (e.g., transmitting the data in the local latch groupings 302 to the error processing circuit 190 and subsequent processes). The ECC coordination signal 406 can be generated according to one or more predetermined conditions, such as implementation or a lack thereof for one or more operations and/or a trigger timing.

The ECC coordination circuit 410 can include an enable circuit 412, a timing circuit 414, and/or an ECC counter 416. The enable circuit 412 can be configured to determine operation-based trigger condition for implementing the maintenance broadcasts. For example, the enable circuit 412 can detect refresh or ZQ calibration operations for initiating the maintenance broadcasts. The enable circuit 412 can provide a trigger signal to the timing circuit 414 when the appropriate trigger condition is determined. The timing circuit 414 (e.g., a pulse generator) can generate the ECC coordination signal 406 based on the enable status from the enable circuit 412.

Additionally or alternatively, the timing circuit 414 (e.g., a pulse generator) can generate the ECC coordination signal 406 based on a rebroadcast frequency that corresponds to the tracked error count or rate from the performance monitoring circuit 320.

The timing circuit 414 can be configured to derive the rebroadcast frequency based on the tracked error count. For example, the timing circuit 414 can increase the frequency of the rebroadcast when the tracked error count exceeds a predetermined threshold within a duration and/or across a set number of command implementations. Also, the timing circuit 414 can decrease the frequency when the tracked error count is below a lower threshold within the duration/set number of implementations.

The broadcast control circuit 402 can coordinate the maintenance broadcast based on the ECC coordination signal 406. For example, the broadcast control circuit 402 can generate a token clock used to coordinate the broadcasts of information from the local latch groupings 302 to the error processing circuit 190, processing of the locally latched fuse data, communication of corrected fuse data to the local latch groupings 302, and/or loading of the corrected fuse data. Also, the broadcast control circuit 402 can coordinate the sequence of the local latch groupings 302 by generating a token value so that the correct grouping transmits and/or loads the relevant information.

The error processing circuit 190 can further include an ECC processing circuit 420 configured to generate the error detection-correction data (e.g., the parity data) based on the fuse data. Also, the ECC processing circuit 420 can process the locally latched data and the error detection-correction data to detect corruptions in the locally latched data and/or to correct the locally latched data. The ECC processing circuit 420 can generate the corrected fuse data when corruptions are detected in the received fuse data. The ECC processing circuit 420 can process the error detection-correction according to a predetermined ECC mechanism (e.g., a checksum mechanism, a turbo code mechanism, etc.).

The apparatus 100 can further include a multiplexer 430 configured to selectively output the data from the fuse array 180 and/or the ECC processing circuit 420. In some embodiments, the multiplexer 430 can select the output from the fuse array 180 for the initial broadcast and select the output from the ECC processing circuit 420 for the maintenance broadcasts. The multiplexer 430 can select the outputs according to an output selection signal 432.

In other example embodiments, the error processing mechanism can include additional fuses in the fuse array 180 configured to store the parity data that has been predetermined using the predetermined fuse data. When the ECC processing circuit 420 receives the locally latched fuse data from the local latch groupings 302, the ECC processing circuit 420 can access the fuse array 180 to obtain the corresponding parity data. The ECC processing circuit 420 can use the parity data to detect and correct corruptions in the locally latched fuse data.

FIG. 4B illustrates an example implementation of an access coordination circuit 450. The access coordination circuit 450 can include circuitry configured to coordinate broadcasting timings/sequences for the local latch groupings 302 of FIG. 3 and/or the error processing circuit 190 of FIG. 1. In some embodiments, each access coordination circuit 450 can correspond to one/each local latch grouping 302.

The access coordination circuit 450 can receive a token clock signal 451 from the broadcast control circuit 402 of FIG. 4A. The access coordination circuit 450 can include a pulse generator 452 configured to generate local access signals according to the token clock signal 451. For example, the pulse generator 452 can output two local access signals (e.g., clock pulses) for each period of the token clock signal 451.

One of the local access signals (e.g., the first pulse) can correspond to the fuse data and the other local access signals (e.g., the second pulse) can correspond to the parity data. The access coordination circuit 450 can include other circuitry (described in detail below) configured to generate the match signal when the token value matches the predetermined token associated with the corresponding local latch grouping 302.

The access coordination circuit 450 can include an output control circuit (e.g., an AND device 458) configured to generate a communication trigger signal for the corresponding local latch grouping 302. The communication trigger signal can control the local latching circuits 200 of FIG. 2 or a portion therein (e.g., the load circuit 212 of FIG. 2). For the initial broadcast, the communication trigger signal can control the local latching circuits 200 to load the broadcasted fuse data (according to, e.g., the first pulse from the pulse generator 452) and/or the corresponding parity data (according to, e.g., the second pulse from the pulse generator 452). For the maintenance broadcasts, the access coordination circuit 450 can receive an error status 459 from the ECC processing circuit 420 of FIG. 4A. The error status 459 can represent whether the locally latched data for the tokened local latch grouping was corrupted. Details regarding the operation of the apparatus 100 for the initial broadcast and the maintenance broadcasts are described below.

Figure 5:
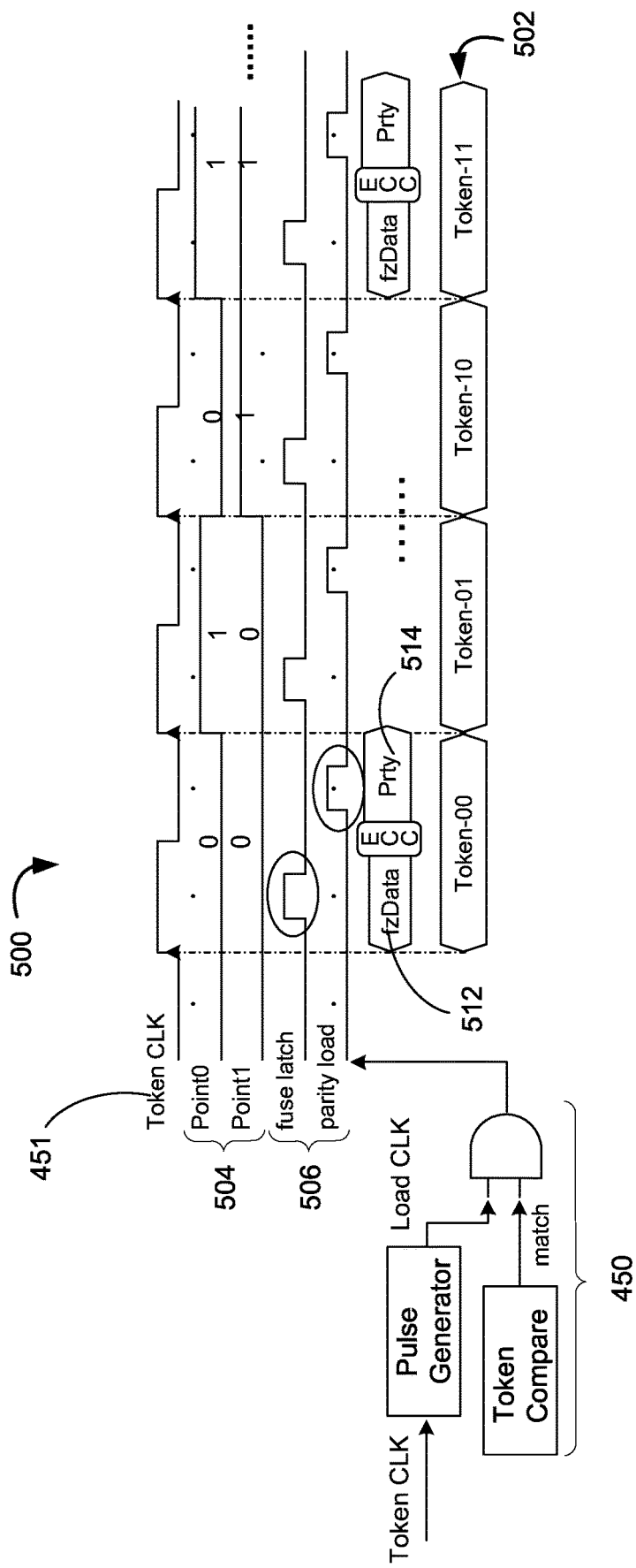
FIG. 5 is a timing diagram for an initial fuse broadcast in accordance with an embodiment of the present technology.

FIG. 5 is a timing diagram 500 for an initial fuse broadcast in accordance with an embodiment of the present technology. The initial broadcast can begin following a triggering condition, such as a power-on reset, as described above. For example, the apparatus 100 of FIG. 1 can generate the broadcast control signal 404 of FIG. 4A based on detecting the triggering condition. The broadcast control circuit 402 of FIG. 4A can sequentially access predetermined locations/fuse groupings in the local latches 182 of FIG. 1 and broadcast the accessed fuse data onto the broadcast communication path 310 of FIG. 3. The broadcast control circuit 402 and/or the access coordination circuit 450 of FIG. 4B can sequentially coordinate the corresponding local latch groupings 302 of FIG. 3 to load the broadcasted fuse data.

In some embodiments, the broadcasted fuse data can also be obtained at the ECC processing circuit 420 of FIG. 4A. The ECC processing circuit 420 can process the fuse data to generate the corresponding error detection/correction data (e.g., parity data) as described above. The error detection/correction data can be broadcasted by the ECC processing circuit 420 before the broadcast of the next fuse data.

As an illustrative example, the timing diagram 500 shows the apparatus 100 broadcasting to four locations (e.g., four fuse data to four sets of latch groupings and/or four functional circuits). The broadcast control circuit 402 can generate the token clock signal 451 to coordinate the broadcasts and the corresponding data processing. In some embodiments, the token clock signal 451 can be generated according to a predetermined frequency/period (e.g., a clock signal having a period from 1 ns up to 100 ms or more).

Following the broadcast triggering condition, the broadcast control circuit 402 can also sequentially generate/update a token value 502 (e.g., '00', '01', '10', and '11') according to the token clock signal 451. For example, the broadcast control circuit 402 can increment the token value 502 after each period of the token clock signal 451. The token value 502 can be communicated according to a set of corresponding bit values 504. The token bit values 504 can be communicated (via, e.g., a shift register chain) to the local latch groupings 302.

Each of the local latch groupings 302 can correspond to a unique token value 502 (e.g., '00', '01', '10', or '11'). The access coordination circuit 450 can include a token compare circuit that compares the token value 502 to a unique assigned token for the corresponding local latch grouping 302. The token compare circuit can generate the match signal when the token value 502 matches the unique assigned token for the corresponding local latch grouping 302. Accordingly, the access coordination circuit 450 can generate one or more load signals 506 when the token value 502 indicates the corresponding local latch grouping. For the example illustrated in FIG. 5, the access coordination circuit 450 can generate two load signals 506. A first of the load signals 506 (e.g., corresponding to a rising edge of the token clock signal 451) can correspond to a fuse latch read signal used to load fuse data 512 into the local latch grouping 302. A second of the load signals 506 (e.g., corresponding to a falling edge of the token clock signal 451) can correspond to a parity load signal used to load parity data 514 into the local latch groupings 302.

Additionally or alternatively, the access coordination circuit 450 can provide the load signals 506 to the error processing circuit 190 in addition to the local latch groupings 302. The first of the load signals 506 can be used to load the fuse data 512 into the ECC processing circuit 420. Between the load signals 506, the ECC processing circuit 420 can process the fuse data 512 and generate the parity data 514 as described above. The ECC processing circuit 420 use the second of the load signals 506 to output and communicate the parity data 514.

In some embodiments, the local latch groupings 302 can ignore the fuse data 512 in response to the first of the load signals 506. Instead, the access coordination circuit 450 can output the fuse data 512 along with the parity data 514 in response to the second of the load signals 506. The local latch groupings 302 can load the fuse data 512 and the parity data 514 in response to the second of the load signals 506.

The apparatus 100 can increment the token value 502 (e.g., according to the token clock signal 451) to broadcast a full set of fuse data to a designated set of the local latch groupings 302. For the example illustrated in FIG. 5, the broadcast control circuit 402 can increment the token value 502 up by one value/number for each period of the token clock signal 451. The broadcast control circuit 402 can increment the token value 502 up to a predetermined threshold (e.g., four or '11' for the example illustrated in FIG. 5) that corresponds to the number of functional circuits that require the broadcasted data. The broadcast control circuit 402 can terminate the initial broadcast when the token value 502 meets or exceeds (e.g., cycles through) the predetermined threshold.

Figure 6:
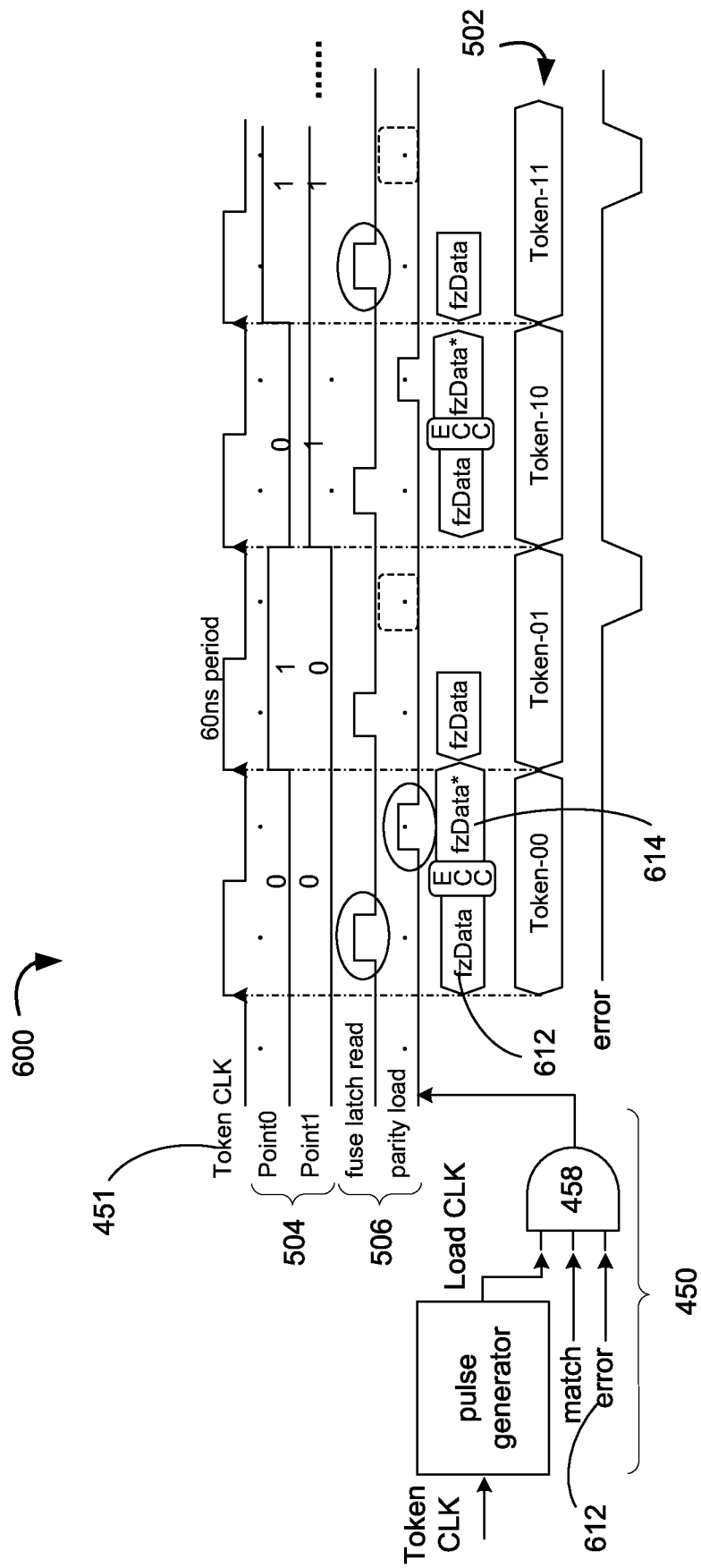
FIG. 6 illustrates a timing diagram for a maintenance broadcast in accordance with an embodiment of the present technology.

FIG. 6 illustrates a timing diagram 600 for a maintenance broadcast in accordance with an embodiment of the present technology. The maintenance broadcast can begin following a maintenance condition, such as a data source impedance calibration (ZQ Cal latch), a refresh operation, an end of a preceding operation, and/or a maintenance frequency, as described above. For example, the apparatus 100 of FIG. 1 can generate the ECC coordination signal 406 of FIG. 4A based on detecting the maintenance condition. The broadcast control circuit 402 of FIG. 4A and/or the access coordination circuit 450 of FIG. 4B can sequentially coordinate the local latch groupings 302 of FIG. 3 to broadcast locally latched data 612 (e.g., the data corresponding to the fuse data 512 of FIG. 5 and/or the parity data 514 of FIG. 5) onto the broadcast communication path 310 of FIG. 3. The broadcast control circuit 402 and/or the access coordination circuit 450 can coordinate the ECC processing circuit 420 of FIG. 4A to load and analyze the broadcasted information. The ECC processing circuit 420 can process the locally latched data 612 to determine whether the locally latched data 612 has been corrupted, such as when the locally latched data 612 is different from the fuse data 512. The ECC processing circuit 420 can generate and output corrected data 614 (e.g., corrected result of the locally latched data 612, such as to match the initially broadcasted fuse data 512 and/or the parity data 514).

As an illustrative example, the timing diagram 600 shows the apparatus 100 broadcasting to four locations (e.g., four fuse data to four sets of latch groupings and/or four functional circuits) as described above for FIG. 5. The broadcast control circuit 402 can generate the token clock signal 451 to coordinate the maintenance broadcasts and the corresponding data processing. In some embodiments, the token clock signal 451 can be generated according to a predetermined frequency/period (e.g., a clock signal having a period from 1 ns up to 100 ms or more). Following the maintenance triggering condition, the broadcast control circuit 402 can also sequentially generate/update the token value 502 (e.g., '00', '01', '10', and '11') as described above. The token value 502 and/or the token bit values 504 to the local latch groupings 302.

The local latch groupings 302 can broadcast the locally latched data 612 therein when the token value 502 corresponds to the assigned tokens. For example, the access coordination circuit 450 can generate the load signals 506 according to the token clock signal 451 and the match signal as described above. The access coordination circuit 450 can further generate the load signals 506 according to an error signal 616. In some embodiments, a default value/state of the error signal 616 can be configured (e.g., an active state) to allow the AND device 458 to generate the load signals 506 (e.g., the first of the load signals 506) according to the other inputs (e.g., the token clock signal 451 and/or the match signal). The error signal 616 can be generated by the broadcast control circuit 402.

The ECC processing circuit 420 can load the locally latched data 612 according to the first of the load signals 506. The ECC processing circuit 420 can process the locally latched data 612 as described above. The ECC processing circuit 420 can maintain the error signal 616 when the locally latched data 612 includes one or more errors. The access coordination circuit 450 can continue to generate the load signals 506 (e.g., the second of the load signals 506) accordingly. The ECC processing circuit 420 can also generate the corrected data 614 between the load signals 506 based on detecting the error. The ECC processing circuit 420 can generate or output the corrected data 614 onto the broadcast communication path 310 according to the continued load signal (e.g., the second of the load signals 506). The corresponding local latch grouping can also load the corrected data 614 according to the continued load signal (e.g., the second of the load signals 506).

Otherwise, as illustrated for token values '01' and '11', the ECC processing circuit 420 can adjust (e.g., deactivate) the error signal 616 when the locally latched data 612 does not include the errors. In some embodiments, the access coordination circuit 450 can refrain from generating the load signals 506 (e.g., the second of the load signals 506) according to an adjustment of the error signal 616. Accordingly, the ECC processing circuit 420 can refrain from generating/outputting the corrected data 614 and/or the corresponding local latch grouping can refrain from loading the corrected data 614.

Similar to the initial broadcast, the apparatus 100 can increment the token value 502 (e.g., according to the token clock signal 451) to trigger the full set of the local latch groupings 302 to sequentially broadcast the locally latched data 612. Also, the apparatus 100 can terminate the maintenance broadcast when the token value 502 meets or exceeds (e.g., cycles through) the predetermined threshold.

In some embodiments, the broadcast control circuit 402, the ECC coordination circuit 410, and/or the access coordination circuit 450 can be configured to pause the progression of the maintenance broadcast. In other words, the apparatus 100 can temporarily stop and resume the token clock signal 451 and/or changes in the token value 502 according to one or more predetermined conditions. For example, the enable circuit 412 of FIG. 4A can remove the enable status when the maintenance triggering condition is no longer available, such as when the refresh operation and/or the data source impedance calibration ends and/or when the apparatus 100 receives one or more types of operational commands. The timing circuit 414 of FIG. 4A can remove or deactivate the ECC coordination signal 406 of FIG. 4A according to the change in the maintenance triggering condition. In response, the broadcast control circuit 402 the ECC coordination circuit 410, and/or the access coordination circuit 450 can stop transitions and retain states of the token clock signal 451 and/or the token value 502. When the maintenance triggering condition is detected again, the apparatus 100 can start from the retained states and resume the remaining portion of the maintenance broadcast.

Figure 7:
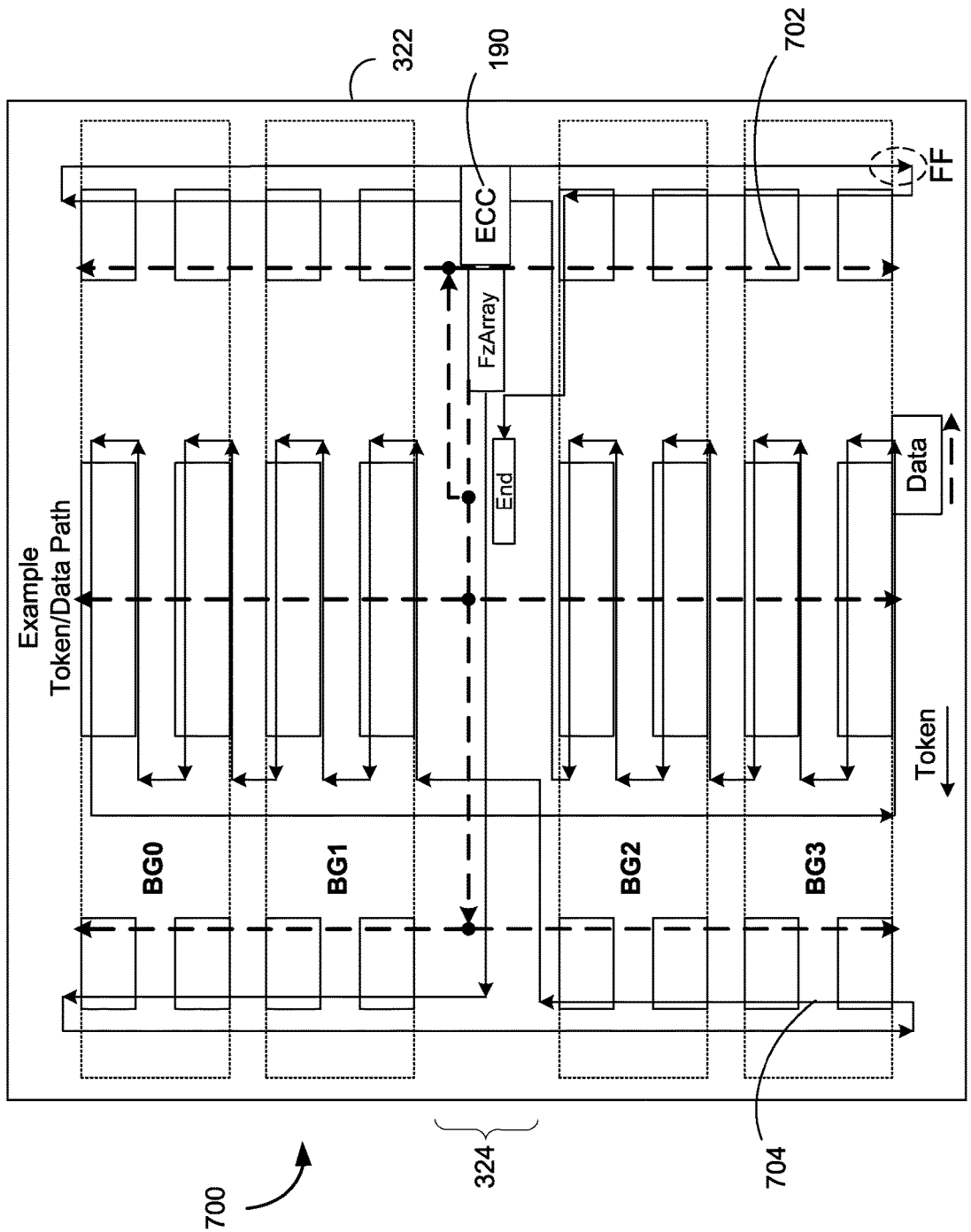
FIG. 7 is a block diagram of an example processing sequence for the error processing mechanism in accordance with an embodiment of the present technology.

FIG. 7 is a block diagram of an example processing sequence 700 for the error processing mechanism in accordance with an embodiment of the present technology. The processing sequence 700 can correspond to a layout of one or more connections, such as the broadcast communication path 310 of FIG. 3, the error processing path 312 of FIG. 3, signal paths for one or more of the clock or token signals described above, and the like. For example, the processing sequence 700 can correspond to a physical layout and the corresponding sequence/arrangement of electrical connections within the die 322.

As described above, one or more portions of the apparatus 100 can be implemented on one die 322. The error processing circuit 190 can include one set of circuits that process the error related data for one or more or all of the fuse data in the fuse array 180 of FIG. 1 and/or one or more or all of the local latch groupings 302 of FIG. 3 on the die 322. For example, the error processing circuit 190 can be implemented as a central/global ECC unit that is shared across all latch groupings on the die. In some embodiments, the error processing circuit 190 can be physically located in the center portion 324 and/or proximate to the fuse array 180.

The processing sequence 700 can correspond to a data path 702. The data path 702 can correspond to the electrical connections used to communicate the fuse data 512 of FIG. 5, the parity data 514 of FIG. 5, the locally latched data 612 of FIG. 6, and/or the corrected data 614 of FIG. 6. In some embodiments, the data path 702 can be implemented as a bus and/or a buffer chain. Alternatively or additionally, the data path 702 can connect the local latch groupings 302 to each other in parallel.

The processing sequence 700 can further correspond to a token path 704. The token path 704 can correspond to the electrical connections used to communicate the token value 502 of FIG. 5 (via, e.g., the token bit values 504 of FIG. 5 or other sequentially identification/designation mechanism). In some embodiments, the token path 704 can be implemented as a linked shift register chain. Alternatively or additionally, the token path 704 can electrically connect the local latch groupings 302 in series. For the example illustrated in FIG. 7, the token path 704 can connect the local latch groupings 302 corresponding to the same functional circuit and/or similar physical locations across bank groups and then connect the local latch groupings 302 corresponding to different types of functional circuits and/or different physical locations.

Figure 8:
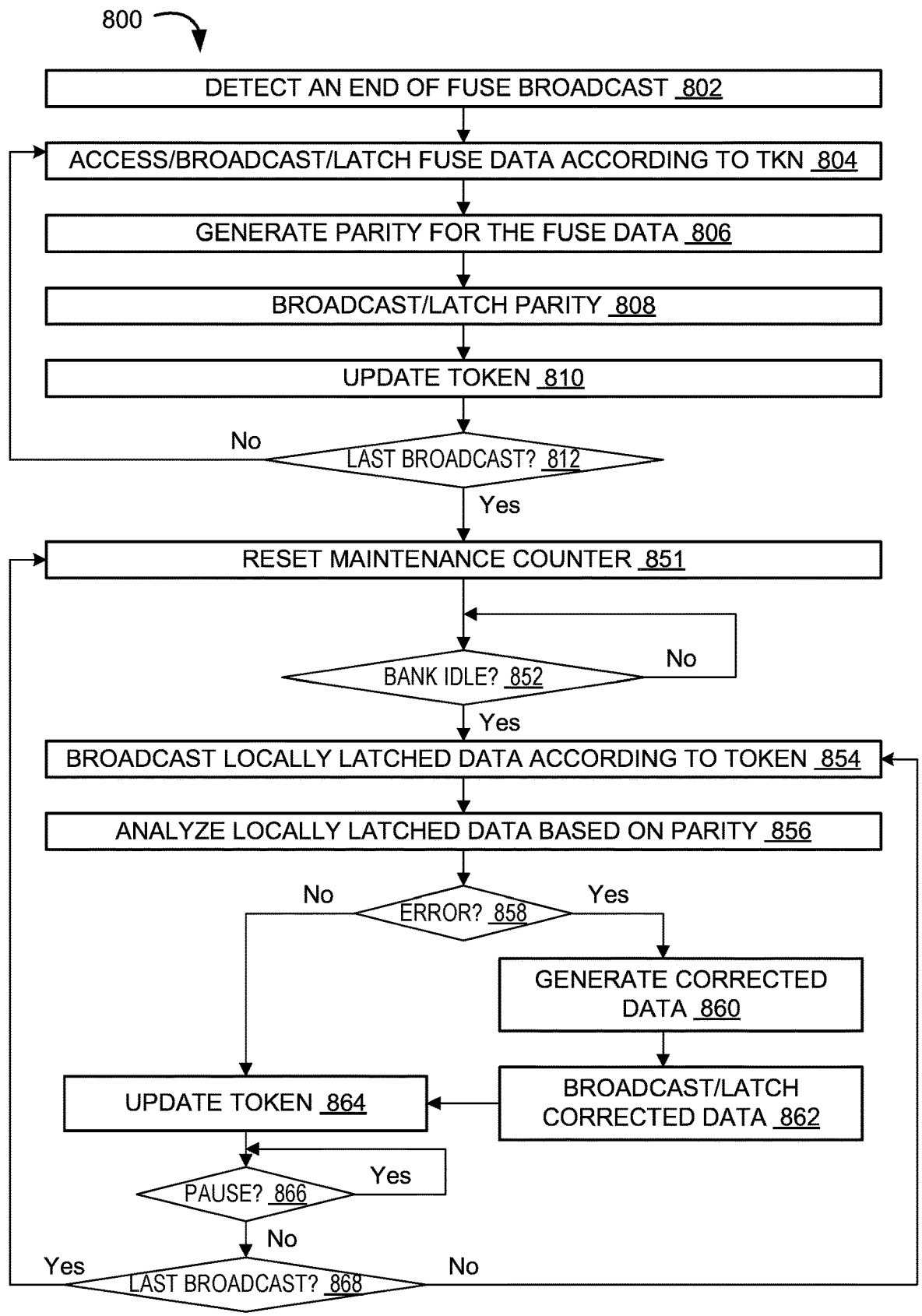
FIG. 8 is a flow diagram illustrating an example method of operating an apparatus in accordance with an embodiment of the present technology.

FIG. 8 is a flow diagram illustrating an example method 800 of operating an apparatus (e.g., the apparatus 100 of FIG. 1, the die 322 of FIG. 3, or a combination thereof) in accordance with an embodiment of the present technology. The method 800 can be for implementing the initial broadcast and/or the maintenance broadcast as described above. For example, the method 800 can be for operating the fuse array 180 of FIG. 1, the local latches 182 of FIG. 1, the error processing circuit 190 of FIG. 1, and/or other circuits described above. Also, the method 800 can be for implementing the timing diagram 500 of FIG. 5 (e.g., blocks 802-812) and/or the timing diagram 600 of FIG. 6 (e.g., blocks 852-826).

At block 802, the apparatus 100 can detect an end of fuse broadcast. For example, the enable circuit 412 of FIG. 4A can detect the end of a fuse broadcast according to a predetermined timing or condition.

At block 804, the apparatus 100 can access, broadcast, and latch fuse data according to a predetermined sequence (e.g., token). For example, the broadcast control circuit 402 of FIG. 4A can access the fuse data 512 of FIG. 5 stored in the fuse array 180 based on detecting the initial broadcast condition. The broadcast control circuit 402 can generate and increment the token value 502 of FIG. 5 for the initial broadcast process. The broadcast control circuit 402 can access the fuse data 512 according to a predetermined pattern of locations that correspond to the token value. The broadcast control circuit 402 can broadcast the accessed unit of the fuse data 512 over the broadcast communication path 310 of FIG. 3. The broadcast control circuit 402 can broadcast the accessed fuse data to the local latch groupings 302 of FIG. 3 and/or the error processing circuit 190 (e.g., the ECC processing circuit 420 of FIG. 4A). The local latch grouping 302 corresponding to the token value 502 can latch the broadcasted fuse data. The access, broadcast, and/or the latch can be coordinated according to a first of the load signals 506 of FIG. 5.

At block 806, the apparatus 100 can generate parity for the fuse data. The ECC processing circuit 420 can obtain the broadcasted fuse data 512 over the error processing path 312 of FIG. 3 and determine the parity data 514 of FIG. 5 based the obtained fuse data 512. The ECC processing circuit 420 can determine the parity data 514 by generating it according to a predetermined ECC mechanism as described above. The ECC processing circuit 420 can generate the parity data 514 between the first and second load signals 506.

At block 808, the apparatus 100 can broadcast and latch parity. For example, the ECC processing circuit 420 can broadcast the parity data 514 over the broadcast communication path 310 and/or the error processing path 312. The ECC processing circuit 420 can broadcast the parity data 514 before the token value 502 is incremented and before the subsequent fuse data is broadcasted. The local latch grouping 302 associated with the token value 502 can latch the broadcasted parity data 514. The broadcast and latch can be coordinated based on the second of the load signals 506.

At block 810, the apparatus 100 can update the token. For example, the broadcast control circuit 402 can increment the token value 502 according to the token clock signal 451 of FIG. 4B.

At decision block 812, the apparatus 100 can determine whether the last broadcast condition has been reached. When the last broadcast condition has not been satisfied, the apparatus 100 can broadcast, and latch fuse data accessed from a subsequent location corresponding to the updated token value as represented by the feedback loop to block 804. Accordingly, the apparatus 100 can iteratively access, broadcast, latch, and process the fuse data stored in the local latches 182. When the last broadcast condition has been satisfied, the apparatus 100 can end the initial broadcast process and the apparatus 100 can implement runtime operations (e.g., memory operations, such as reads and/or writes).

After the last broadcast, the initial broadcast process can terminate. The apparatus 100 can begin runtime operation after terminating the initial broadcast process. At block 851, the apparatus 100 can reset a maintenance counter. The maintenance counter can track values for coordinating periodical maintenance (e.g., error detections/corrections, refresh operations, etc.). The apparatus 100 can reset the maintenance counter following the initial broadcast sequence described above.

At decision block 852, the apparatus 100 can determine whether one or more memory banks are idle (e.g., not accessing or operating on data stored in the memory cells therein). The apparatus 100 can continue with the ongoing runtime operation of the banks until the end of the operation. The apparatus 100 can determine the end of the operation according to one or more predetermined parameters, such as a feedback signal, a predetermined duration, etc., thereby determining the idle status of the one or more banks.

When the one or more memory banks are idle, the apparatus 100 can broadcast locally latched data according to token as illustrated at block 854. After the normal operation ends and/or when the one or more memory banks are idle, the enable circuit 412 of FIG. 4A, the timing circuit 414 of FIG. 4A, and/or the performance monitoring circuit 320 of FIG. 4A can detect a maintenance broadcast condition based on a received command, a completed operation, an error measure, a maintenance broadcast frequency, or a combination thereof subsequent to initial broadcast of the set of fuse data as described above. For example, the broadcast control circuit 402 can iteratively coordinate the local latch groupings 302 to transmit/broadcast the locally latched data 612 thereof over the broadcast communication path 310 according to the token value 502.

At block 856, the apparatus 100 can analyze locally latched data based on parity. The ECC processing circuit 420 can obtain the broadcasted locally latched data 612 via the broadcast communication path 310 and the error processing path 312. The broadcast and the reception of the locally latched data 612 can be coordinated using a first of the load signals 506.

At decision block 858, the apparatus 100 can determine whether the analyzed latched data includes one or more errors. The ECC processing circuit 420 can dynamically derive (e.g., during runtime and/or immediately in response to obtaining the locally latched data 612) an error status based on the obtained locally latched data 612. In some embodiments, the locally latched data 612 can include a portion that corresponds to the locally latched instance of the parity data. In some alternative embodiments, the ECC processing circuit 420 can obtain the parity data 514 from the fuse array 180. The ECC processing circuit 420 can process the locally latched data 612 using the corresponding parity data 514 according to the ECC mechanism. The ECC processing circuit 420 can derive the error status as a representation of whether the locally latched data matches the initially broadcasted fuse data. The ECC processing circuit 420 can control (e.g., adjust or maintain) the error status 459 of FIG. 4B according to the derived error status. The ECC processing circuit 420 can analyze the locally latched data 612 and derive the error status between the first and second of the load signals 506.

At block 860, the apparatus 100 can generate corrected data (e.g., the corrected data 614 of FIG. 6) when the locally latched data includes one or more errors. The ECC processing circuit 420 can generate the corrected data 614 based on implementing the error correction according to the ECC mechanism using the locally latched data 612 and the corresponding parity data 514. The corrected data 614 can be for replacing the locally latched data 612, thereby curing or undoing the data corruption (e.g., soft errors) that occurred at the corresponding fuse latches. The ECC processing circuit 420 can generate the corrected data 614 between the first and second of the load signals 506.

At block 862, the apparatus 100 can broadcast and latch corrected data. The ECC processing circuit 420 can broadcast the corrected data 614 over the error processing path 312 and the broadcast communication path 310. The ECC processing circuit 420 can broadcast the corrected data 614 according to the second of the load signals 506 and before broadcasting the subsequent unit of the locally latched data 612. Also, the local latch grouping 302 corresponding to the token value 502 can latch the corrected data 614, thereby replacing the corrupted latched data.

At block 864, the apparatus 100 can increment the token, such as when the locally latched data does not include errors and/or after broadcasting/latching the corrected data. For example, the broadcast control circuit 402 can increment the token value 502 as described above. Accordingly, when the locally latched data 612 does not include errors, the apparatus 100 can progress to the next iterative instance of the local latch grouping 302, thereby broadcasting the subsequent unit of fuse data without broadcasting other information (e.g., the corrected data 614).

At decision block 866, the apparatus 100 can determine whether to pause the maintenance broadcast. For example, the apparatus 100 can determine whether to pause the maintenance broadcast based on whether the maintenance broadcast condition is still present. When the pause condition is satisfied (e.g., when the bank/memory is accessed), the apparatus 100 can temporarily stop the maintenance broadcast process. The broadcast control circuit 402 can freeze the token clock signal 451 and retain the token value 502 as described above. The apparatus 100 can implement other runtime operations (e.g., memory operations) until the bank idle condition/state is detected again.

When the pause condition is not present (e.g., when the maintenance broadcast condition is present), the apparatus 100 can determine whether the last broadcast condition has been reached. The apparatus 100 can check for the last broadcast condition as described above for decision block 812 (e.g., initial broadcast process). When the last broadcast condition has not been satisfied, the apparatus 100 can broadcast locally latched data from the next latch grouping according to the updated token as illustrated by the feedback loop to block 854. Accordingly, the apparatus 100 can iteratively broadcast, analyze, and/or correct the locally latched data across the latch groupings. When the last broadcast condition has been satisfied, the apparatus 100 can reset the maintenance counter and implement runtime operations while checking for maintenance trigger condition (e.g., idle state of one or more memory banks) as illustrated by the feedback loop to block 851.

Figure 9:
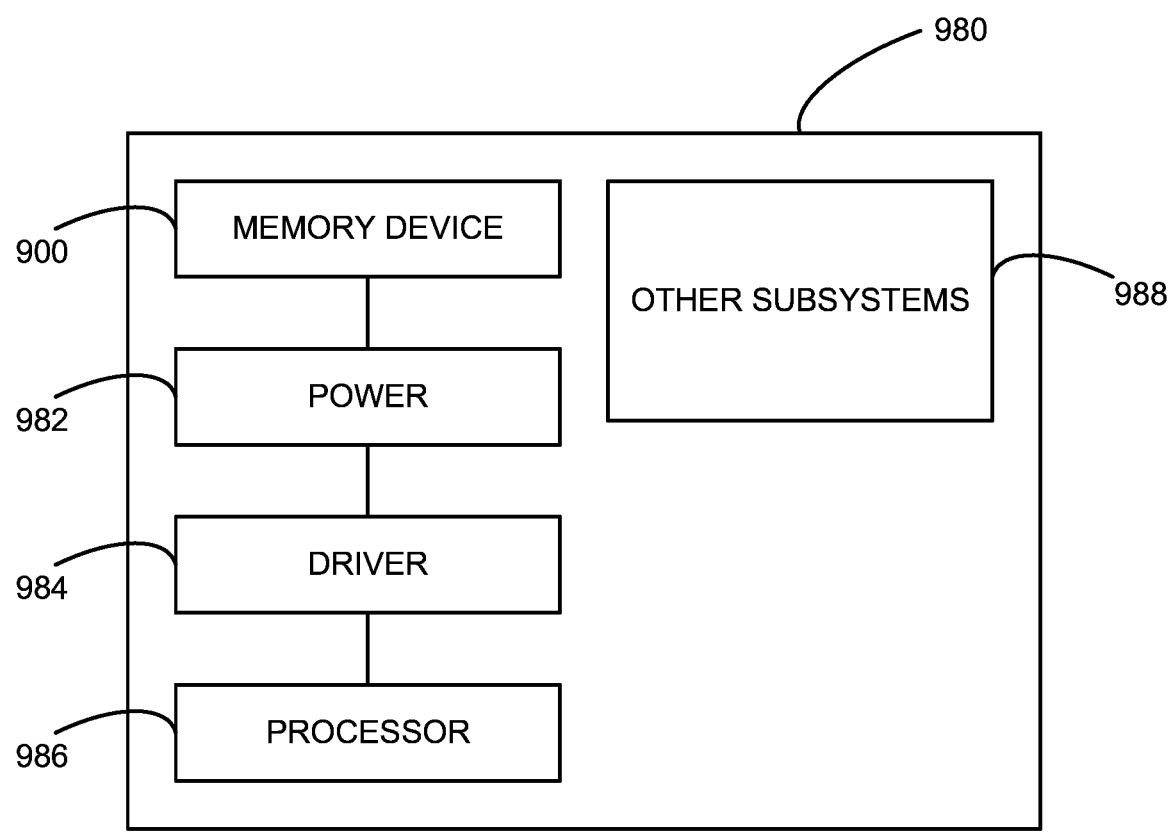
FIG. 9 is a schematic view of a system that includes an apparatus in accordance with an embodiment of the present technology.

FIG. 9 is a schematic view of a system that includes an apparatus in accordance with embodiments of the present technology. Any one of the foregoing apparatuses (e.g., memory devices) described above with reference to FIGS. 1-8 can be incorporated into any of a myriad of larger and/or more complex systems, a representative example of which is system 980 shown schematically in FIG. 9. The system 980 can include a memory device 900, a power source 982, a driver 984, a processor 986, and/or other subsystems or components 988. The memory device 900 can include features generally similar to those of the apparatus described above with reference to FIGS. 1-8, and can therefore include various features for performing a direct read request from a host device. The resulting system 980 can perform any of a wide variety of functions, such as memory storage, data processing, and/or other suitable functions. Accordingly, representative systems 980 can include, without limitation, hand-held devices (e.g., mobile phones, tablets, digital readers, and digital audio players), computers, vehicles, appliances and other products. Components of the system 980 may be housed in a single unit or distributed over multiple, interconnected units (e.g., through a communications network). The components of the system 980 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of DRAM devices. Apparatuses configured in accordance with other embodiments of the present technology, however, can include other types of suitable storage media in addition to or in lieu of DRAM devices, such as, devices incorporating NAND-based or NOR-based non-volatile storage media (e.g., NAND flash), magnetic storage media, phase-change storage media, ferroelectric storage media, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or implementation occurring during operation, usage or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to FIGS. 1-9.

What is claimed is:

1. An apparatus, comprising:
   a fuse array configured to provide non-volatile storage of a set of fuse data, wherein each unit of fuse data of the set of fuse data is configured to be used by a functional circuit in the apparatus during runtime;
   a set of local latch groupings communicatively coupled to the fuse array, wherein each local latch grouping of the set of local latch groupings is configured to store a corresponding unit of the fuse data of the set of fuse data for a corresponding functional circuit; and
   an error processing circuit communicatively coupled to the set of local latch groupings, the error processing circuit configured to process, during the runtime, a set of parity data,
      wherein each unit of parity data within the set of parity data is associated with a corresponding unit of fuse data of the set of fuse data,
      wherein each unit of parity data is for detecting and/or correcting a corruption in the corresponding unit of fuse data, and
      wherein the error processing circuit is implemented on a die and is configured to globally process the set of parity data for groupings of latch circuits implemented on the die.

2. The apparatus of claim 1, further comprising a broadcast communication path configured to communicate (1) the set of fuse data to the set of local latch groupings during an initial broadcast and (2) locally latched data from the set of local latch groupings to the error processing circuit during a maintenance broadcast subsequent to the initial broadcast.

3. The apparatus of claim 1, further comprising:
   a broadcast control circuit configured to iteratively access and communicate each unit of fuse data of the set of fuse data, wherein each unit of fuse data is accessed from the fuse array and communicated to the set of local latch groupings for an initial broadcast;
   wherein the error processing circuit is configured to iteratively:
      obtain each unit of fuse data as it is broadcasted to the set of local latch groupings;
      dynamically generate the unit of parity data corresponding to the obtained unit of fuse data; and
      before a subsequent unit of fuse data is initially broadcasted, broadcast the unit of parity data to the set of local latch groupings.

4. The apparatus of claim 3, further comprising:
   a read coordination circuit configured to generate a first load signal and then a second load signal;
   wherein:
      the broadcast control circuit is configured to access and broadcast one unit of fuse data of the set of fuse data based on the first load signal; and
      the error processing circuit is configured to:
         obtain the one unit of fuse data based on the first load signal;
         dynamically generate the corresponding unit of parity data before the second load signal; and
         broadcast the corresponding unit of parity data based on the second load signal.

5. The apparatus of claim 4, wherein:
   the broadcast control circuit is configured to iteratively increment a token value across a set of numbers that each correspond to one grouping of the set of local latch groupings;
   the read coordination circuit is configured to generate the first and second load signals for each increment of the token value;
   each grouping of the set of local latch groupings (1) includes fuse latches and one or more parity latches and (2) is configured to:
      load the unit of fuse data into the fuse latches based on the first load signal for a corresponding token value; and
      load the corresponding unit of parity data into the parity latches based on the second load signal for a corresponding token value.

6. The apparatus of claim 4, wherein:
   the error processing circuit is configured to broadcast the unit of fuse data along with the unit of parity data based on the second load signal; and
   the set of local latch groupings is configured to load the unit of fuse data and the unit of parity data into a corresponding grouping therein based on the second load signal.

7. The apparatus of claim 1, wherein:
   the set of local latch groupings is configured sequentially broadcast locally latched data across each grouping during a maintenance broadcast, wherein each unit of the locally latched data represents the unit of fuse data that has been latched in the corresponding grouping of latches since a previous broadcast event or an initial broadcast event;
   wherein the error processing circuit is configured to iteratively:
      obtain the each unit of the locally latched data; and
      dynamically derive an error status based on the obtained unit of the locally latched data and the corresponding unit of parity data, wherein the error status represents whether the locally latched data matches the initially broadcasted unit of fuse data.

8. The apparatus of claim 7, wherein the error processing circuit is configured to communicate corrected data for replacing the locally latched data when the error status indicates the locally latched data fails to match the initially broadcasted unit of fuse data, wherein the corrected data corresponds to the initially broadcasted unit of fuse data.

9. The apparatus of claim 8, further comprising:
   a read coordination circuit configured to generate a first load signal and then a second load signal;
   wherein:
      the set of local latch groupings is configured to:
         broadcast one unit of the locally latched data from one of the groupings therein based on the first load signal; and
         load the corrected data into the one of the groupings based on the second load signal;

the error processing circuit is configured to:
obtain the one unit of the locally latched data based on the first load signal;
dynamically derive the error status and the corrected data between the first and second load signals; and
broadcast the corrected data based on the second load signal.

10. The apparatus of claim 7, further comprising:
a broadcast control circuit configured to iteratively increment a token value across a set of numbers that each correspond to one grouping of the set of local latch groupings; and
wherein:
each grouping of the set of local latch groupings is configured to broadcast the locally latched data thereof when the token value matches a predetermined value assigned to the corresponding grouping.

11. The apparatus of claim 10, wherein the broadcast control circuit is configured to:
initiate the maintenance broadcast according to a triggering condition, wherein initiating the maintenance broadcast includes generating and toggling a token clock signal configured to coordinate processes for the error processing circuit and/or the set of local latch groupings;
detect a change in the triggering condition;
pause the token clock signal based on the change;
retain the token value and the paused token clock signal during one or more memory operations; and
resuming the token clock signal with the retained token value when the triggering condition is restored.

12. The apparatus of claim 7, further comprising:
a monitoring circuit coupled to the error processing circuit and configured to track an error measure associated with an amount or a frequency of mismatches in the locally latched data matches and the corresponding initial unit of fuse data;
a timing circuit coupled to the monitoring circuit and configured to:
derive a triggering frequency based on the error measure, wherein the triggering frequency corresponds to a duration between implementations of the maintenance broadcast; and
initiate the maintenance broadcast according to the triggering frequency.

13. The apparatus of claim 1, wherein the error processing circuit is located at a center portion within the die.

14. The apparatus of claim 1, wherein the apparatus comprises a Dynamic Random-Access Memory (DRAM).

15. A method of operating an apparatus, the method comprising:
detecting an initial broadcast condition;
accessing a set of fuse data from a fuse array based on detecting the initial broadcast condition;
iteratively broadcasting the set of fuse data to a set of local latch groupings and an error processing circuit;
based on the broadcast, latching each unit of fuse data of the set of fuse data at a corresponding grouping of the set of local latch groupings; and
using the error processing circuit, determining a unit of parity data based on the broadcasted unit of fuse data, wherein the unit of parity data is for detecting and/or correcting a corruption in the corresponding unit of the fuse data of the set of fuse data.

16. The method of claim 15, further comprising:
before a subsequent unit of fuse data of the set of fuse data is initially broadcasted, broadcasting the unit of parity data from the error processing circuit; and
latching the broadcasted unit of parity data at the corresponding grouping of the set of local latch groupings that latched the unit of the fuse data corresponding to the broadcasted unit of parity data.

17. The method of claim 16, further comprising:
detecting a maintenance broadcast condition based on a received command, a completed operation, an error measure, a maintenance broadcast frequency, or a combination thereof subsequent to initial broadcast of the set of fuse data;
iteratively broadcasting locally latched data from the set of local latch groupings based on detecting the maintenance broadcast condition, wherein each unit of the locally latched data represents a unit of the fuse data of the set of fuse data that has been latched in the corresponding grouping of latches since a previous broadcast event or the initial broadcast;
obtaining the each unit of the locally latched data at the error processing circuit; and
using the error processing circuit, dynamically deriving an error status based on the obtained unit of the locally latched data and the corresponding unit of parity data, wherein the error status represents whether the locally latched data matches the initially broadcasted fuse data of the set of fuse data.

18. The method of claim 17, further comprising:
using the error processing circuit, generating corrected data for replacing the locally latched data when the error status indicates the locally latched data fails to match the initially broadcasted fuse data of the set of fuse data;
before the subsequent unit of fuse data of the set of fuse data is initially broadcasted, broadcasting the corrected data from the error processing circuit; and
latching the corrected data at the corresponding grouping of the set of local latch groupings instead of the broadcasted unit of the locally latched data.

19. The method of claim 17, wherein iteratively broadcasting the locally latched data includes broadcasting the subsequent unit of fuse data without broadcasting other information when the error status indicates the unit of the locally latched data analyzed by the error processing circuit matches the initially broadcasted fuse data.

* * * * *